United States Patent

Spanner et al.

[11] Patent Number: 5,711,084
[45] Date of Patent: Jan. 27, 1998

[54] LINEAR ENCODER

[75] Inventors: Erwin Spanner, Traunstein; Peter Pechak, Stein/Traun, both of Germany

[73] Assignee: Dr. Johannes Heidenhain GmbH, Traunreut, Germany

[21] Appl. No.: 627,238

[22] Filed: Apr. 1, 1996

[30] Foreign Application Priority Data

Apr. 6, 1995 [DE] Germany ............... 195 12 892.3

[51] Int. Cl.$^6$ ................................ G01B 11/04
[52] U.S. Cl. ................. 33/706; 33/702; 33/707
[58] Field of Search ............... 33/706, 702, 703, 33/704, 707, 708

[56] References Cited

U.S. PATENT DOCUMENTS

| 4,273,447 | 6/1981 | Nelle | 33/707 |
|---|---|---|---|
| 4,912,856 | 4/1990 | Ernst | 33/702 |
| 5,375,338 | 12/1994 | Nelle | 33/702 |

FOREIGN PATENT DOCUMENTS 3106701 9/1982 Germany ............... 33/702

*Primary Examiner*—Christopher W. Fulton
*Attorney, Agent, or Firm*—Anderson, Kill & Olick P.C.

[57] ABSTRACT

A linear encoder for measuring a relative position of two objects displaceable relative to each other, including a scale for being secured on one of the objects and formed of a graduation carrying measuring standard and a measuring standard support, and a device for scanning the scale and securable on another of the objects, with the measuring standard support having two regions, which are spaced from each other in a direction of a longitudinal extent of the measuring standard for supporting the measuring standard, one of supporting regions forming a stationary support area and another of the supporting regions forms an elastic support area, and with the stationary and elastic support areas being formed as substantially continuous or interrupted linear support areas extending transverse to the longitudinal extent of the measuring standard.

24 Claims, 2 Drawing Sheets

LINEAR ENCODER

BACKGROUND OF THE INVENTION

The present invention relates to a linear encoder for measuring a relative position of two objects displaceable relative to each other and including a scale for being secured on one of the objects and formed of a graduation carrying measuring standard and a measuring standard support, and a device for scanning the scale and securable on another of the objects, with the measuring standard support having two regions, which are spaced from each other in a direction of a longitudinal extent of the measuring standard for supporting the measuring standard.

German publication DE-05 25 05 587 discloses attachment of a measuring standard to its support by an elastic glue layer to prevent thermal tensions in the measuring standard. It was also suggested to use instead of a continuous elastic adhesive layer, spaced from each other resin pieces to which the measuring standard is secured and which should provide for compensation of thermal tension between the measuring standard and its support. Using of spaced resin pieces is disclosed in German patent No. 1,176,382, in German publication DE-OS 33 12 534, and in U.S. Pat. No. 4,569,137. However, when resin pieces are used for attachment of the measuring standard to the support, rather large residual forces remain which unacceptably deform the measuring standard. A drawback of this method consists in that after a temperature compensation, the measuring standard does not return to its initial position, but, as a result of friction forces, occupies a new undetermined position. As a result, the longlasting constrained forces cause deformations noticeable as some kind of ripples on the glass of the measuring standard, which lead to an erroneous measurement of a relative position of two objects measured in a longitudinal direction of the measuring standard.

German document DE-OS 34 20 734 discloses mounting of an encoder so that the encoder housing is fixedly attached to a machine at one of its end, with the opposite end being elastically secured with a deformable element.

European publication EP 0 264 801 discloses securing a scale or a ruler along a small region with rollable balls which provide for retaining the scale or the ruler in a fixed position with respect to its mounting. The costs of providing such a support of a measuring standard are very high.

It is further known to support a scale at two areas so that the scale has a minimal deflection. The exact position of these areas depends on the allowable deflection (e.g., dependent on whether the graduation is provided on the outer surface or in the neutral area of the scale). Also, a reduction of the total length (Bessel points), or a minimal deflection along the entire length at parallel end surfaces (Airy points), or a disappearing deflection in the middle can be optimized.

An object of the invention is a linear encoder in which the constraining forces acting on the measuring standard are minimized as much as possible, and thermally induced tensions between the measuring standard and its support are eliminated.

SUMMARY OF THE INVENTION

This and other objects of the invention, which will become apparent hereinafter, are achieved by providing a linear encoder in which one of the supporting regions for the measuring standard forms a stationary support area and another of the supporting regions forms an elastic support area, and the stationary and elastic support areas are formed as substantially linear support areas extending transverse to the longitudinal extent of the measuring standard, and in which the linear support areas comprises one of continuous support areas and interrupted support areas.

With the attachment of the measuring standard to its support according to the present invention, they are mechanically decoupled from each other at the greatest possible extent. The measuring standard can, with changing temperatures, move effortlessly relative to its support, so that no thermally induced deformations of the measuring standard occur.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
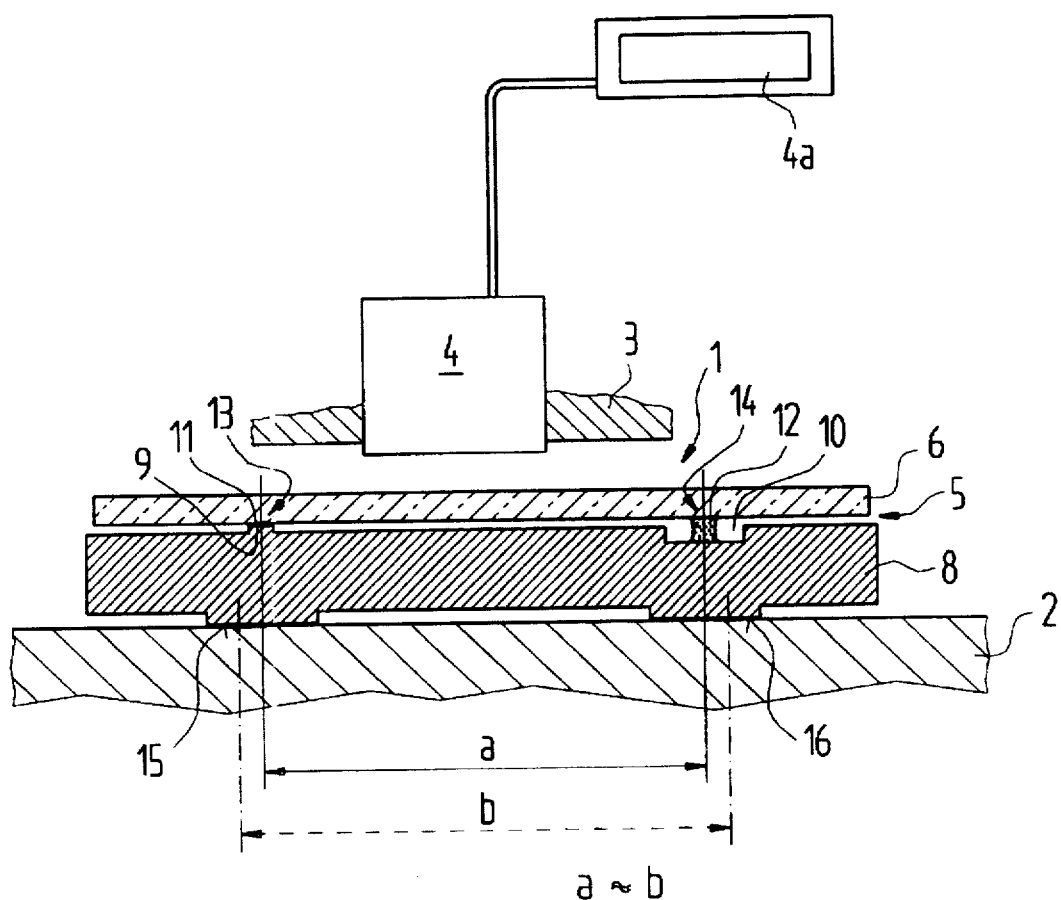
FIG. 1 shows a partially cross-sectional view of a linear encoder according to the present invention.

FIG. 1 shows a basic view of a linear encoder 1, which serves for measuring of a relative position of two objects, e.g., a bed and a slide of a machine. The first object, the slide, is designated in FIG. 1 with a reference numeral 2 and the second object, the bed, is designated with a reference numeral 3. A scanning device 4 for scanning a scale 5 is supported on the bed 3. The scanning device 4 is connected with an evaluation unit 4a. The scale 5 is secured to the slide 2.

Figure 2:
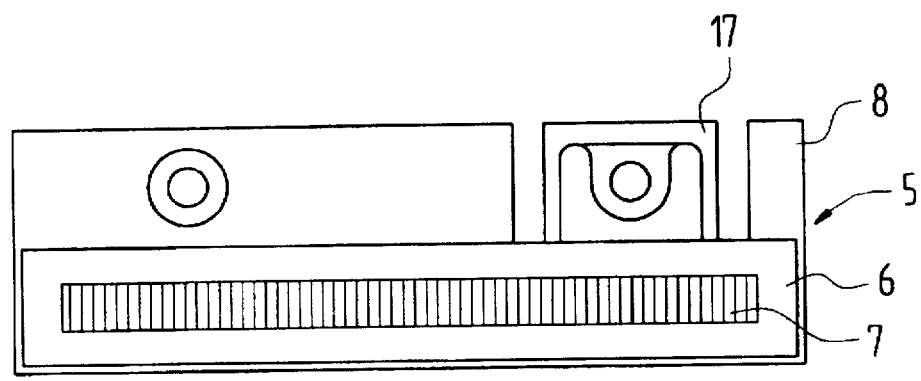
FIG. 2 shows a plan view of a scale of the linear encoder shown in FIG. 1.

The scale 5 is formed of a measuring standard 6 carrying a graduation 7, which is shown in FIG. 2. The measuring standard 6 is secured to a support 8. The support 8 has a web strap 9 and a recess 10. The web 9 and the recess 10 are spaced from each other a predetermined distance in a direction of a longitudinal extent of the measuring standard 6 and the support 8.

The web 9 and the recess 10 provide for securing of the measuring standard 6 on the support 8. The securing is effected by gluing the measuring standard 6 to the support 8. The bonding compound 11 secures the measuring standard 6 on the support 8 at the web 9 in a predetermined position and with a predetermined width of the gluing area. As the bonding compound 11, an epoxy resin can be used.

The measuring standard 6 is also secured to the support 8 at the recess 10 with an elastic bonding compound 12, e.g., a silicone glue. The glue joint at the recess 10 is relatively thicker than that at the web g. The measuring standard 6 is elastically secured to the support 8 at the recess 10 due to the greater elasticity of the bonding compound 12.

The two glue joint form a substantially linear support areas 13 and 14 which support the measuring standard 6 in suitable regions. The distance a between the support areas 13 and 14 is optimally selected with regard to the length of the measuring standard in accordance with the Norms for support of bar-shaped bodies which are generally known from the linear measuring technique.

By the above-described attachment of the measuring standard 6 to the support 8, a predetermined thermal behavior for the combination of the measuring standard 6 and the support 8 is achieved.

For maintaining this predetermined thermal behavior of the combination measuring standard 6 and the support 8, which together form the scale 5, the support 8 has two regions 15 and 16, having a predetermined surface area, at which the support 8 is secured to the slide 2. The distance b of between the areas 15 and 16 in the direction of the longitudinal extent of the measuring standard 6 and the support 8 approximately corresponds to the distance a between the areas 13 and 14 at which the measuring standard 6 is secured to the support 8.

With regard to the expansion behavior, it is advantageous when one of the connection regions, e.g., region 15 forms a neutral point (or line), and this point, transverse to the longitudinal extent of the scale 5, forms together with the fixed area 13 a neutral line with respect to the thermal behavior. At this neutral point, the scale 5 is fixedly connected with slide 2 by a screw (not shown).

Figure 3:
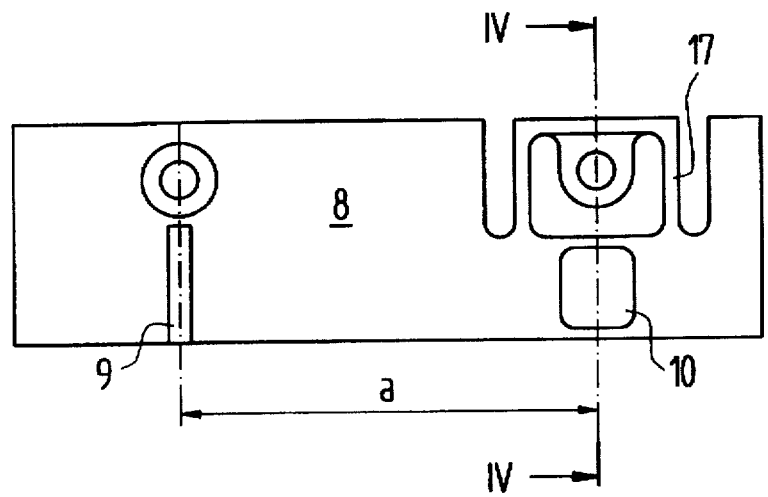
FIG. 3 shows a plan view of a measuring standard support of the linear encoder shown in FIG. 1.
Figure 4:
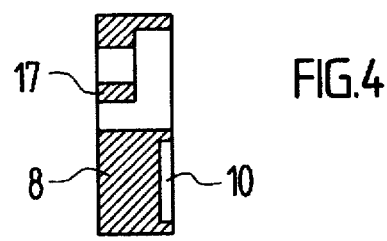
FIG. 4 shows a cross-sectional view along line IV—IV in FIG. 3.

The surface area 16 is formed as a length compensating element 17 for compensating a thermally induced expansion. This compensating element 17 can be formed as a spring parallelogram incorporated into the support 8, as shown in FIGS. 2, 3 and 5.

Of course, the length compensating element can be formed in another way, e.g., by a spring-biased slot screw joint extending transverse to the longitudinal extent of the scale 5 in the vicinity of the glued area 12.

To minimize the danger of wrapping of the support 8 as a result of an uneven support surface, with which the support 8 is attached to the slide 2, the backside of the support 8 can be made thicker in the surface areas 15 and 16. The cross-section of the support 8 is not limited to a rectangular shape, but can also have a U–, L–, T–, I– and etc. shape.

Figure 5:
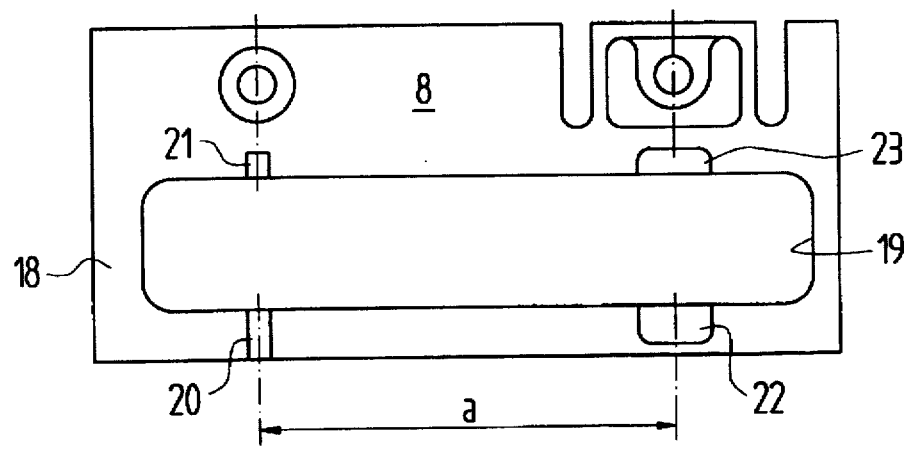
FIG. 5 shows a plan view of a frame-shaped measuring standard support.

In case the support 8 is formed as a frame 18, as shown in FIG. 5, and beneath the graduation 7 of the measuring standard 6, has a break-through 19, so called transmitting light scales can be used.

In this case, the measuring standard supporting surfaces should be interrupted transverse to the longitudinal extent of the support 8 by the break-through 19. In this case, surface areas 20, 21, 22 and 23, which can be seen in FIG. 5, should be respectively, substantially aligned on opposite sides of opposite longitudinal sides of the break-through 19.

To provide a scale 5 according to the present invention, advantageously, the support 8 is formed of a material having a coefficient of thermal expansion similar to that of a material from which the measuring standard 6 is formed. E.g., in case of the measuring standard being made of ZERODUR™, INVAR™, an alloy steel with a similarly small coefficient of thermal expansion, is used for forming the support 8.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A linear encoder for measuring a relative position of two objects displaceable relative to each other, the encoder comprising:
   a scale for being secured on one of the objects and formed of a graduation carrying measuring standard and a measuring standard support; and
   means for scanning the scale and securable on another of the objects,
   wherein the measuring standard support has two regions, which are spaced from each other in a direction of a longitudinal extent of the measuring standard for supporting the measuring standard,
   wherein one of the supporting regions forms a stationary support area and another of the supporting regions forms an elastic support area, the stationary and elastic support areas being formed as substantially linear support areas extending transverse to the longitudinal extent of the measuring standard,
   wherein the linear support areas comprise one of continuous support areas and interrupted support areas, and
   wherein the measuring standard is secured to the support at the stationary support area with a setting glue, and is secured at the elastic support area with an elastic glue.

2. A linear encoder as set forth in claim 1, wherein a distance between the two support regions with regard to a length of the measuring standard is determined according to Norms for support of bar-shaped bodies.

3. A linear encoder as set forth in claim 1, wherein, the stationary support area is formed by a strap provided on the support, and the elastic support area is formed by a recess provided in the support.

4. A linear encoder as set forth in claim 1, wherein the support has two spaced mounting areas for attachment of the support to the one of the objects.

5. A linear encoder as set forth in claim 4, wherein one of the mounting areas is formed as a compensating element for compensating a thermally-induced expansion.

6. A linear encoder as set forth in claim 4, wherein a distance between the two mounting areas of the support approximately corresponds to the distance between the two support regions of the support for supporting the measuring standard.

7. A linear encoder as set forth in claim 1, wherein the support is formed as a plate having an arbitrary cross-section.

8. A linear encoder as set forth in claim 1, wherein the support is formed as a frame having in a measuring standard receiving region thereof a transparent break-through.

9. A linear encoder as set forth in claim 1, wherein the measuring standard and the support have similar coefficients of thermal expansion.

10. A linear encoder as set forth in claim 1, wherein the distance between the two support regions corresponds to a distance between Bessel points.

11. A linear encoder as set forth in claim 1, wherein the distance between the two support regions corresponds to a distance between Airy points.

12. A linear encoder for measuring a relative position of two objects displaceable relative to each other, the encoder comprising:
   a scale for being secured on one of the objects and formed of a graduation carrying measuring standard and a measuring standard support, the measuring standard having a first graduation side and a second, opposite side; and means for scanning the scale and securable on another of the objects, wherein the measuring standard support has only two regions, which are spaced from each other in a direction of a longitudinal extent of the measuring standard for supporting the measuring standard at the second side thereof on the support, the measuring standard being secured to the support at the only two regions, wherein one of the only two supporting regions forms a stationary support area and another of the only two supporting regions forms an elastic support area, the stationary and elastic support areas being formed as substantially linear support areas extending transverse to the longitudinal extent of the measuring standard.

13. A linear encoder as set forth in claim 12, wherein a distance between the two support regions with regard to a length of the measuring standard is determined according to Norms for support of bar-shaped bodies.

14. A linear encoder as set forth in claim 12, wherein the stationary support area is formed by a web provided on the support, and the elastic support area is formed by a recess provided in the support.

15. A linear encoder as set forth in claim 12, wherein the stationary support area is formed by a strap provided on the support.

16. A linear encoder as set forth in claim 12, wherein the elastic support area is formed by a recess provided in the support.

17. A linear encoder as set forth in claim 12, wherein the support has two spaced mounting areas for attachment of the support to the one of the objects.

18. A linear encoder as set forth in claim 17, wherein one of the mounting areas is formed as a compensating element for compensating a thermally-induced expansion.

19. A linear encoder as set forth in claims 17, wherein a distance between the two mounting areas of the support approximately corresponds to the distance between the two support regions of the support for supporting the measuring standard.

20. A linear encoder as set forth in claim 12, wherein the support is formed as a plate having an arbitrary cross-section.

21. A linear encoder as set forth in claim 12, wherein the support is formed as a frame having, in a measuring standard receiving region thereof, a transparent break-through.

22. A linear encoder as set forth in claim 12, wherein the measuring standard and the support have similar coefficients of thermal expansion.

23. A linear encoder as set forth in claim 12, wherein the distance between the two support regions corresponds to a distance between Bessel points.

24. A linear encoder as set forth in claim 12, wherein the distance between the two support regions corresponds to a distance between Airy points.

* * * * *